(No Model.)

J. W. HALL.
PNEUMATIC TIRE FOR CYCLES.

No. 535,059. Patented Mar. 5, 1895.

Witnesses
A. N. Dobson
Alphonz Youngs Jr.

Inventor
John W. Hall
By Foster Freeman
attorney

UNITED STATES PATENT OFFICE.

JOHN WILLIAM HALL, OF BIRMINGHAM, ENGLAND.

PNEUMATIC TIRE FOR CYCLES.

SPECIFICATION forming part of Letters Patent No. 535,059, dated March 5, 1895.

Application filed January 25, 1894. Serial No. 497,993. (No model.) Patented in England June 27, 1893, No. 12,544.

*To all whom it may concern:*

Be it known that I, JOHN WILLIAM HALL, a subject of the Queen of England, residing at Birmingham, England, have invented certain new and useful Improvements in or Connected with Pneumatic Tires for Cycles and other Vehicles, (patented to me in Great Britain under No. 12,544, dated June 27, 1893,) of which the following is a specification.

This invention will be best understood by reference to the accompanying drawings which are cross sections of tires constructed according to this invention.

Figure 1:
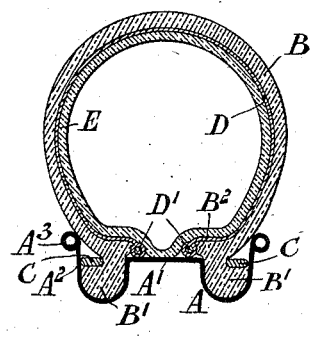
Figure 2:
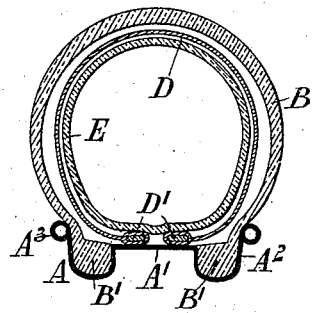
Figure 3:
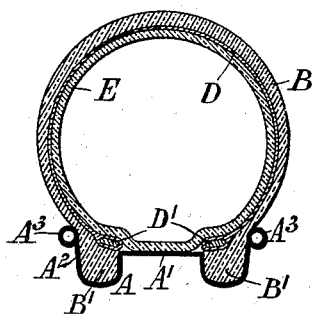
Figure 4:
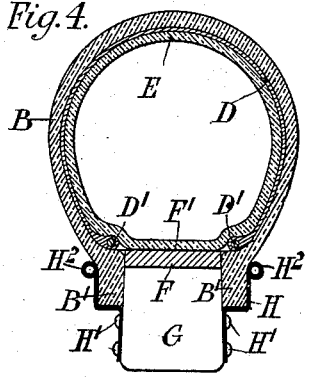
Figure 5:
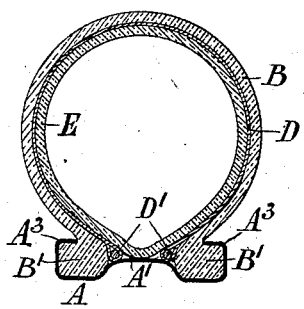
Figures 6, 7:
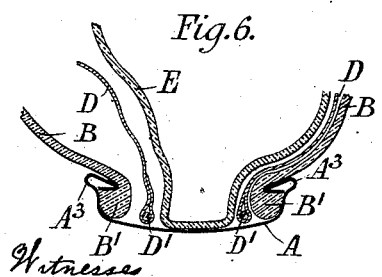

Figure 1 represents my invention as applied to a tire in which a cover with the beads formed on the outside as in the well-known Trigwell tire is employed. Fig. 2 represents before inflation the tire with the beads turned inwardly. Fig. 3 shows the same tire as Fig. 2 after inflation. Fig. 4 represents a similar tire to that shown in Figs. 2 and 3 as applied to the wooden wheel of an ordinary road vehicle. Fig. 5 represents a tire applied to a rim in which the edges of the gutters are turned inwardly. Fig. 6 is a view showing the left hand part in its deflated condition and the right hand part in its inflated condition of a portion of a tire applied to another form of rim with inwardly-turned edges, and Fig. 7 represents portions of a tire the cover of which is provided at its edges with non-stretchable hoops applied to a modified form of the guttered rim.

Like letters represent like parts throughout the drawings.

Describing first Fig. 1, the rim A may be of the usual Trigwell pattern with a central raised portion or platform A' and side channels or gutters $A^2$, the outer edges $A^3$ of which are shown of larger diameter than the diameter of the platform A'. The cover B is made of rubber and provided on each edge with a bead B' adapted to fit a channel or gutter $A^2$ and retained therein by a band or hoop C of any suitable construction and capable of having its ends connected or disconnected and tightened up by a lever or other suitable arrangement as may be required, a band C serving to hold the beads B' in the channels $A^2$. The cover is also provided with internal projections or ribs $B^2$ at the junction of the cover and the beads the object of which is to prevent the hoops D', one of which is provided in each edge of the canvas restraining cover D from slipping into the channels $A^2$ beside the beads B'. This is not likely to happen, but in case the beads B' were not good fits in the channels $A^2$ it might happen if the ribs $B^2$ were not used.

The outer cover B is made of rubber only not lined with canvas as is usual with outer covers the reason for this being that the strain due to the inflation of the tire is taken entirely by the canvas restraining cover D and it is therefore unnecessary to strengthen the rubber cover B although I may strengthen the beads and adjacent parts of the cover by means of canvas worked in during the process of manufacture, and I sometimes prefer to line the whole of the rubber cover with fine canvas or linen.

E is the rubber air tube provided with a valve which may pass through a hole in the rim for inflation in the usual manner.

A strip of canvas with loose edges is preferably inserted between the air tube and the platform A' to prevent chafing of the air tube. This strip is not shown in the drawings.

The canvas or other suitable material of which the restraining cover D is made is preferably cut on the cross or bias its edges being connected to or round the wire hoops D'. Preferably the canvas is wrapped round the wires and fastened back upon itself by rubber solution or other means so as to form a pipe to contain the wire.

Suitable pockets may be formed in the rim and the outer cover to receive the fastenings of the wires or bands which hold the cover in place and these pockets will serve to prevent creeping of the cover. To prevent any creeping of the restraining cover, I prefer to form suitable projecting pieces on the wires in the edges of the same which may engage with holes, recesses, studs or their equivalents in the rim or the holes or studs may be formed in or on the lower parts of the sides of the outer cover and preferably in that part which is below the outer edge of the rim.

To place my improved tire as above described in position on the rim I preferably proceed as follows:—I first place the outer rubber cover B over the rim and having secured one of the beaded edges B' in one of the gutters A² I turn the cover inside out right off the rim. One of the wired edges D' of the canvas restraining cover D is then worked over the edge of the rim into the unoccupied gutter and being pulled down into the same on one side the rest of the wired edge is easily passed over the edge of the rim into the gutter and from there it is pushed right over the central platform A' until it is pressed hard against the small bead B² on the inside of that edge of the outer cover which is already fixed in the rim. The air tube E is now placed in position on the rim with the valve in the hole in the same and the other wired edge of the canvas restraining cover is passed over the edge of the rim in the same way as the first one and is placed in position on the raised platform. The outer rubber cover B is then brought over the canvas cover D and its beaded edge secured in the gutter in the rim in the same manner as the first one after which the tire is ready for inflation.

I sometimes make my rims of an ordinary trough shaped section instead of with a central platform as above described and in this case the ends of the wires D' in the edges of the canvas cover D are joined by means of a right and left handed screw or by hooks or other means in order that the ends of the wires may be disengaged so as to enable them to be got over the edges of the rim. In this case the wired edges of the canvas restraining cover rest on the bottom of the rim.

Fig. 5 shows an arrangement in which the edges A³ of gutters A² are turned inwardly so as to present a holding surface under which the outwardly turned beads B' of the cover B are held and prevented from escaping by drawing inwardly by the air pressure forcing the hoops D' against them. In this view the rim has the raised platform A' as in Fig. 1.

In Fig. 6 the edges A³ of the rim are turned inwardly and the beads B' of the cover B are turned outwardly and engage with them as in Fig. 5, but the platform A' is dispensed with, a trough or crescent-shaped rim being adopted. The right-hand side of this figure shows the tire in its working position when inflated, the hoop D' maintaining the bead B' in its proper position under the edge of the rim A³. The left hand side of the figure shows the tire deflated and the hoop D' slipped away from the bead B' which can then be easily withdrawn from under the internal projecting edge A³ of the rim.

In Fig. 7 the same parts, viz., the air tube E, the canvas restraining cover D with its non-stretchable bands D' and the cover B are all employed, but the cover B is provided with wire or other non stretchable hoops in pipes at the edges of the cover, the hoops being joined or tightened up in any convenient manner after the cover is placed upon the rim. The rim also is shown with slight gutters to accommodate the edges of the cover.

In Fig. 2 the beads B' are turned inwardly instead of outwardly as in Fig. 1 and the hoops D' of the canvas restraining cover D are arranged when the tire is inflated to be drawn sidewise on top of the beads B' as clearly shown in Fig. 3, this movement being effected entirely by the inflation of the air tube E which in expanding also expands the canvas cover D as far as it will go thus drawing the hoops D' into the position shown in Fig. 3. In this case the ribs B² are not required and the hoops C which in the arrangement shown in Fig. 1 are employed for holding the cover B' to the rim A are also dispensed with the hoops D' serving the double purpose of withstanding the air pressure in the tube E and also securing the cover B to the rim of the wheel. The hoops D' cannot move outward farther than shown in Fig. 3 being restrained by the cover B against which they bear and with the shape of rim shown in that figure the cover B is itself supported by the preferably beaded edges A³ of the rim. If the edges A³ of the rim did not project so high as shown in Fig. 3 the wires D' would be supported by the cover only which as already stated may be strengthened by canvas or the like.

In Fig. 4 the tire is substantially the same as that set forth in Figs. 2 and 3, but it is shown applied to the wooden wheel of an ordinary road vehicle and in this case the air tube E rests upon the ordinary iron or steel tire F secured in the usual manner upon the wooden felly G. Separate channel plates H are in this case used to form the channels in which the beads B' are contained. These channel plates H form complete annular channels around the rim the plates themselves being formed as complete rings or they may be in sections. They are bolted, screwed or otherwise suitably fastened as at H' to the felly G and it will be observed that the outer edge H² does not reach so far from the center of the wheel as the surface F' of the iron tire F or in other words that the diameter of the circle H² is not so large as the diameter of the circle F'. The object of this is that should the tire puncture it can be immediately entirely removed from the wheel which can then run as an ordinary road wheel upon the iron rim F' without damaging the channel plates H so that the vehicle may complete its journey without unnecessary delay. The tire can then be repaired and at once replaced upon the wheel.

I claim—

1. The combination in a pneumatic tire, of a rim having peripheral side channels or gutters, an outer cover having a bead at each edge adapted to said channels or gutters, an independent air tube, and an independent intermediate cover provided with non-stretchable edges adapted to engage with the beads of the outer cover and lock the latter in the channels or gutters of the rim on the inflation of the air tube, substantially as described.

2. In a pneumatic tire, the combination of a rim having side channels or gutters, an outer expansible cover having a bead at each edge adapted to said channels or gutters, an independent air tube, and an independent intermediate cover provided with hoops at its edges adapted to engage with the beads of the outer cover, said hoops being pulled apart by the expansion of the air tube to lock the beads of the outer cover in the channels or gutters of the rim of the wheel, substantially as described.

3. In a pneumatic tire the combination with an air tube, and an expansible outer cover B having external and internal beads B' B$^2$ of a non-expansible intermediate cover D with non-stretchable edges or bands D' and a rim A' A$^2$ substantially as described.

In testimony whereof I have hereto set my hand in the presence of the two subscribing witnesses.

JOHN WILLIAM HALL.

Witnesses:
ALFRED J. BOULT,
HARRY B. BRIDGE.